(12) United States Patent
Diamond et al.

(10) Patent No.: US 7,841,645 B2
(45) Date of Patent: Nov. 30, 2010

(54) VEHICLES WITH RETRACTABLE PORTIONS

(75) Inventors: David M. Diamond, Junction City, OR (US); Jay L. Howard, Eugene, OR (US)

(73) Assignee: Lee Joint Venture, Junction City, OR (US)

( * ) Notice: Subject to any disclaimer, the term of this patent is extended or adjusted under 35 U.S.C. 154(b) by 348 days.

(21) Appl. No.: 12/012,418

(22) Filed: Feb. 1, 2008

(65) Prior Publication Data

US 2008/0296922 A1   Dec. 4, 2008

(51) Int. Cl.
*B60P 3/37* (2006.01)
*B60P 3/34* (2006.01)

(52) U.S. Cl. .......................... 296/165; 108/44; 108/47; 296/26.12; 296/162; 296/171; 296/175

(58) Field of Classification Search .................. 52/79.5, 52/79.6; 108/44, 47, 48, 115, 116, 117, 14.11, 108/147.17, 152; 296/26.12, 26.15, 162, 296/165, 171, 172, 175, 176, 26.11, 26.13
See application file for complete search history.

(56) References Cited

U.S. PATENT DOCUMENTS

| | | | | |
|---|---|---|---|---|
| 2,167,557 | A | | 12/1936 | Stout |
| 2,636,773 | A | * | 4/1953 | Van Tassel .................. 296/172 |
| 2,786,710 | A | * | 3/1957 | Chapman .................... 296/162 |
| 2,831,722 | A | * | 4/1958 | Hanson et al. ............... 296/172 |
| 3,593,471 | A | * | 7/1971 | Fields ............................ 52/66 |
| 3,743,346 | A | | 7/1973 | Senn et al. |
| 3,997,211 | A | * | 12/1976 | Graves ........................ 296/162 |
| 4,188,057 | A | * | 2/1980 | Pauli ........................... 296/162 |
| 4,223,938 | A | * | 9/1980 | Born .............................. 296/21 |
| 4,413,855 | A | * | 11/1983 | Flanagan .................... 296/162 |
| 4,869,030 | A | * | 9/1989 | Clark .......................... 52/79.6 |
| 4,874,197 | A | * | 10/1989 | Grable ........................ 296/162 |
| 4,918,772 | A | | 4/1990 | Haile |
| 5,040,467 | A | * | 8/1991 | King ............................ 108/42 |
| 5,171,056 | A | * | 12/1992 | Faludy et al. ................ 296/163 |
| 5,417,468 | A | | 5/1995 | Baumgartner et al. |
| 5,667,267 | A | | 9/1997 | Talucci |
| 5,761,854 | A | | 6/1998 | Johnson et al. |
| 5,899,518 | A | * | 5/1999 | Schreiner .................. 296/26.01 |
| 6,345,471 | B1 | | 2/2002 | Gyllenhammar |
| 6,393,769 | B1 | | 5/2002 | Mertik et al. |
| 6,679,541 | B1 | | 1/2004 | Hanser et al. |
| 6,736,446 | B1 | * | 5/2004 | Johnson ...................... 296/162 |
| 6,779,833 | B2 | | 8/2004 | Benz et al. |
| 6,874,283 | B1 | * | 4/2005 | Hindle ........................... 52/67 |

(Continued)

FOREIGN PATENT DOCUMENTS

DE   26 08 872 A1 * 9/1977

*Primary Examiner*—Glenn Dayoan
*Assistant Examiner*—Paul A Chenevert
(74) *Attorney, Agent, or Firm*—Kolisch Hartwell, P.C.

(57) ABSTRACT

An extendible secondary living space for a vehicle. The extendible living space may move from a retracted position in which it is substantially integrated within or in close proximity to a primary living space of the vehicle, to an extended position in which it provides an open-air porch or balcony accessible from the primary living space. The extendible living space may be extended from any wall of the vehicle, such as a side wall or rear wall, and may be particularly well suited for use in motorized recreational vehicles.

9 Claims, 5 Drawing Sheets

U.S. PATENT DOCUMENTS

| | | |
|---|---|---|
| 7,100,625 B2 | 9/2006 | Valles |
| 7,100,967 B2 | 9/2006 | Shea |
| 7,144,058 B1 | 12/2006 | Winter |
| 7,147,268 B2 | 12/2006 | Winter |
| 7,178,849 B1 | 12/2007 | Blodgett, Jr. |
| 2002/0149220 A1 | 10/2002 | Wishart |
| 2002/0189503 A1* | 12/2002 | Hansen ........................ 108/44 |
| 2003/0167701 A1* | 9/2003 | Rich .......................... 52/79.6 |
| 2004/0026958 A1 | 2/2004 | Condino |
| 2006/0145514 A1 | 7/2006 | Cardwell et al. |
| 2006/0267363 A1 | 11/2006 | Crean et al. |
| 2007/0075522 A1 | 4/2007 | Hermon et al. |
| 2007/0096505 A1 | 5/2007 | Haack |

* cited by examiner

VEHICLES WITH RETRACTABLE PORTIONS

CROSS-REFERENCE TO RELATED APPLICATION

This application claims priority from U.S. Provisional Patent Application Ser. No. 60/932,800, filed Jun. 1, 2007 entitled VEHICLES WITH RETRACTABLE PORCHES, the disclosure of which is incorporated herein by reference.

BACKGROUND

Vehicles are ubiquitous in modern society and are used for many purposes. Some vehicles serve utilitarian purposes, some serve recreational purposes, and some serve a combination of both. One type of vehicle that serves both utilitarian and recreational purposes is commonly referred to as a recreational vehicle, or RV. RVs typically transport users from place to place and include living amenities, such as sleeping quarters, cooking facilities, and restroom facilities. As is well known, RVs provide users with means to travel to a destination, as well as providing numerous amenities both during travel and upon reaching the destination.

RVs and other vehicles typically include a variety of features to make a user's stay at a destination more enjoyable. For example, some vehicles provide awnings for shade, power hookups for hooking up electrical devices, and running water for drinking and washing. Some RVs include mechanisms that increase the interior living space of the vehicle by sliding out rooms or compartments from the primary living space of the RV. However, there remains a need for a feature that conveniently allows a user to enjoy being outside on a surface, such as a deck or a balcony, supported by the vehicle.

The following U.S. Patent and U.S. Patent Publication references provide examples of recreational vehicles and are expressly incorporated herein by reference for all purposes: 2007/0096505, 2007/0075522, 2006/0267363, 7178849, 7147268, 7144058, and 7100967.

DETAILED DESCRIPTION

Figure 1:
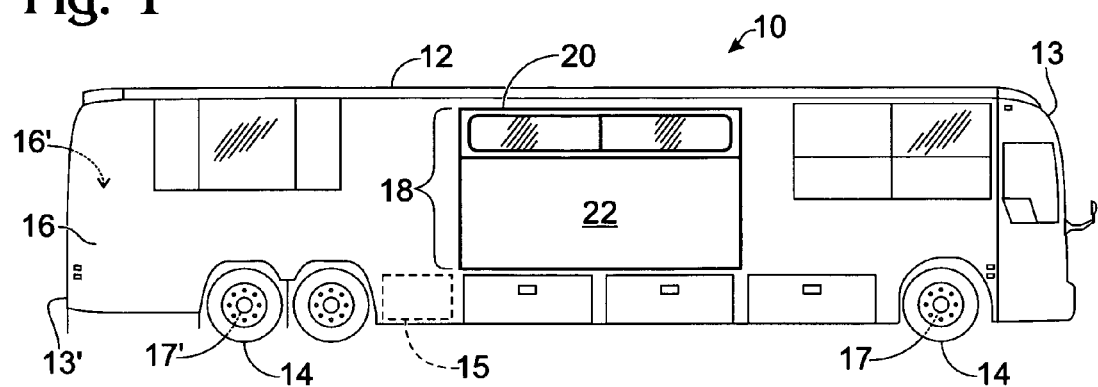
FIG. 1 is a side elevational view of a vehicle with a retractable secondary living space, according to aspects of the present disclosure.

As shown in FIG. 1, a recreational vehicle 10 according to the present disclosure may include a body 12 and a plurality of wheels 14 supporting body 12 from the ground. An engine 15 or any other suitable power system may propel the vehicle by driving one or more axles such as front axle 17 or rear axle 17'. The size of the body and the number of wheels are highly variable, depending on the dimensions of the vehicle and its desired uses. Body 12 includes a primary vehicle portion 16. In FIG. 1, primary vehicle portion 16 defines a primary interior living space 16', which is generally all of the interior space contained within the walls of the primary vehicle portion, minus any interior space unavailable for living, such as space dedicated to the engine, other mechanical systems, electrical systems, storage, or the like. Body 12 also includes an extendible secondary vehicle portion 18, the structure and operation of which will be described in more detail below, disposed at one side of the vehicle. Alternatively, an extendible secondary vehicle portion may extend from other locations at either side or at a rear wall of the vehicle.

Vehicle 10 functions to transport persons and cargo, as well as to provide shelter and living amenities to those residing within it. Transportation is accomplished using any conventional means of locomotion. For example, gasoline or diesel combustion engines, electric motors, hybrid electric/combustion engines, or fuel cell systems may be used to power the vehicle. The engine or other power system(s) of the vehicle may be disposed in any suitable location, including to the rear of the rear axle, to the front of the front axle, or between the front and rear axles of the vehicle. A vehicle having its engine longitudinally disposed between the front and rear axles may be referred to in this disclosure as a "mid-engine vehicle." For instance, FIG. 1 schematically depicts engine 15 disposed between front axle 17 and rear axle 17' of vehicle 10. Furthermore, an engine incorporated within the primary vehicle portion may be referred to as an "onboard engine," to distinguish it from cases in which the engine is located outside of the primary recreational vehicle portion, essentially in a separate vehicle that tows or carries the primary vehicle portion.

In addition to the engine or other means of locomotion, all other systems, controls, and features necessary to operate vehicles known in the art may be included in vehicle 10. Vehicle 10 may provide shelter and living amenities to any extent and in any manner typical for recreational vehicles. For example, vehicle 10 may include running water, sleeping quarters, common living space, kitchen facilities, and the like, in addition to a variety of other conventional amenities.

Body 12 may take the form of any conventional vehicle body known in the art. For example, body 12 typically takes the form of any of the commonly known recreational vehicle body types, which in many cases may bear some resemblance to a bus or a trailer, as depicted in FIG. 1. The body may be modular, and may include a front cap 13 and/or a rear cap 13'. Caps 13 and 13' are body portions respectively attached to the front and rear of the vehicle, which may protect other portions of the vehicle, allow convenient replacement of worn body portions, or allow features to be added to or incorporated into an existing vehicle without replacing the entire vehicle.

In other embodiments, body 12 can take the form of a truck body, a van body, or a "crossover" vehicle body that incorporates features of two or more conventional vehicle types. As noted previously, body 12 will enclose a volume suitable for human occupation and habitation, as well as a volume suitable to contain the controls and systems necessary to operate vehicle 10. The portion suitable for human occupation may be referred to in this disclosure as the primary interior living space 16', all of which is interior to the walls of primary vehicle portion 16 when vehicle 10 is in the configuration shown in FIG. 1.

Figure 2:
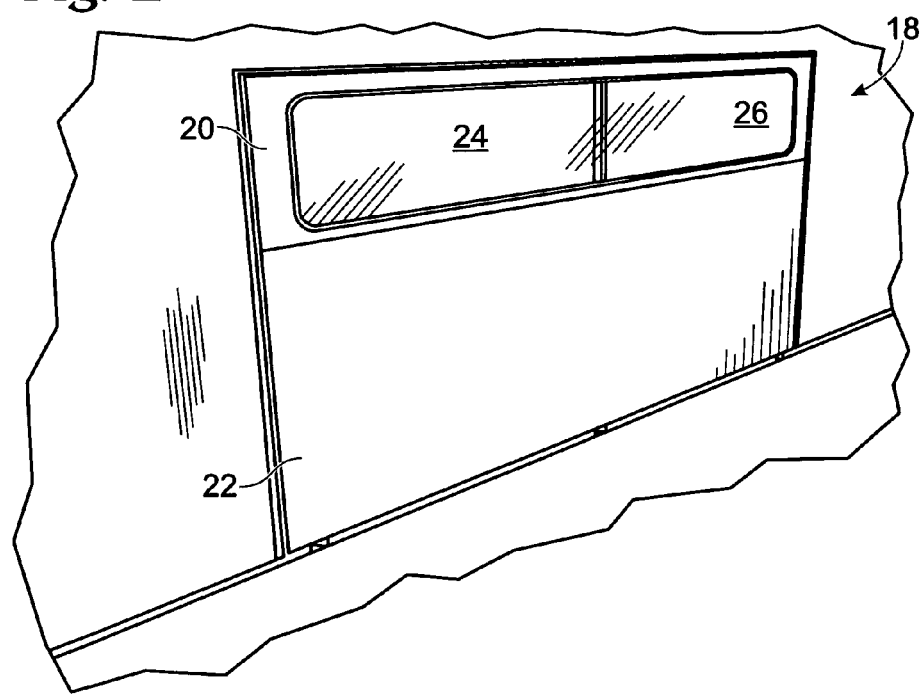
FIG. 2 is a partial perspective view of the vehicle of FIG. 1, showing the secondary living space in a retracted position.
Figure 3:
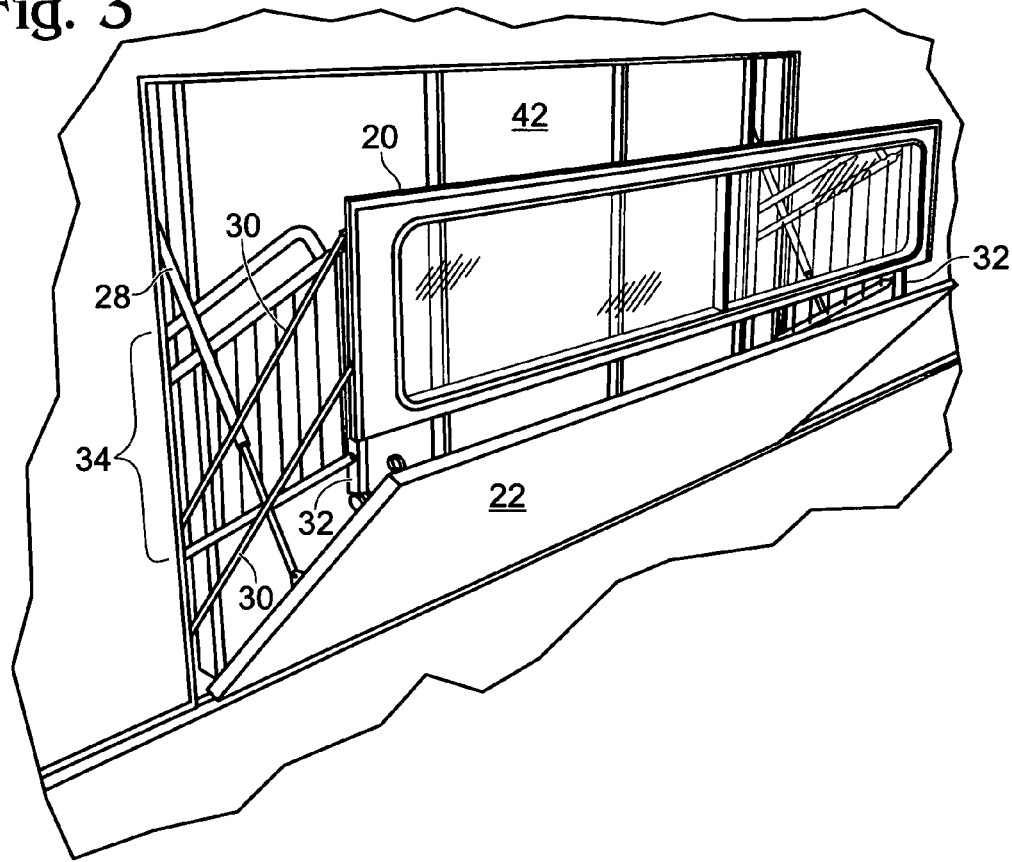
FIG. 3 is a partial perspective view of the vehicle of FIG. 1, showing the secondary living space in a partially extended position.
Figure 4:
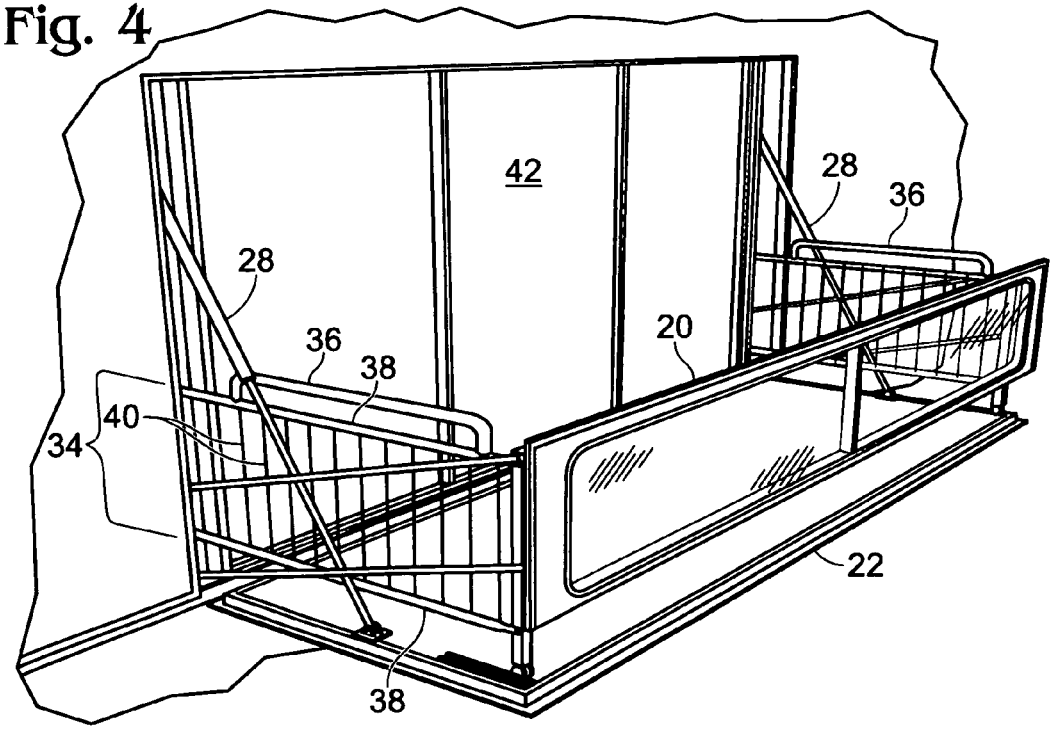
FIG. 4 is a partial perspective view of the vehicle of FIG. 1, showing the secondary living space in an extended position.

FIGS. 2, 3 and 4 are perspective views showing a portion of vehicle 10 that includes secondary vehicle portion 18, with the secondary vehicle portion in various configurations. More specifically, FIGS. 2-4 show secondary vehicle portion progressing from a stowed or retracted position in which it is substantially contained within the primary vehicle portion (see FIGS. 1-2) to a deployed or extended position in which it extends outside the primary vehicle portion and provides a secondary living space, such as an open-air porch or balcony, in addition to the primary interior living space (see FIG. 4). FIG. 3 shows the secondary vehicle portion in an intermediate position that lies somewhere between the retracted position and the extended position. As the drawings indicate, the secondary vehicle portion is selectively movable between the retracted position and the extended position.

As can be seen in FIGS. 1 and 2, secondary vehicle portion 18 defines a sidewall portion of the primary interior living space and of the exterior body structure when in the retracted position. Furthermore, when retracted, the secondary vehicle portion may be completely or partially integrated within the vehicle sidewall of which it defines a portion. In the depicted embodiment, the secondary vehicle portion includes a substantially planar upper member or panel 20 and a substantially planar lower member or panel 22, which, as shown, may be adjacent to each other and substantially nonoverlapping when the secondary vehicle portion is in the retracted position. Alternatively, the upper and lower panels may be partially or substantially overlapping when in their retracted positions, while still attaining any desired individual positions when extended.

In the embodiment depicted in FIGS. 1-4, lower panel 22 is shown adjacent to and directly below upper panel 20. In other embodiments, additional substantially planar members or panels may be interposed between, or placed above and/or below upper panel 20 and lower panel 22, forming a sidewall portion of more than two panels. Upper panel 20 is depicted in FIGS. 1-4 as having a pair of windows 24, 26. In other embodiments, upper panel 20 may have zero, one, or more than two windows. These are provided for aesthetic purposes, to allow light to enter the vehicle, to allow passengers to see out of the vehicle, and to allow a view through the outboard railing wall when the secondary vehicle portion is extended, among other reasons.

As depicted in FIG. 3, secondary vehicle portion 18 is configured to be movable from a retracted position to an extended position and vice versa. This may be accomplished with a pair of extendible actuator members or linear actuator mechanisms 28, although other mechanisms, such as sliding supports for moving the secondary vehicle portion outwardly along a track, also may be employed. In the depicted embodiments, one end of each actuator mechanism is attached to a point within or near the perimeter of the wall portion defined by the secondary vehicle portion, and the other end of each actuator is attached to lower panel 22 at a point near one of its side edges. In other embodiments, the actuator members may be attached in different locations while still accomplishing the same purpose. For example, the upper ends of the actuators may be attached either inside or outside the wall of the vehicle, and similarly, the lower ends of the actuators may be attached at other positions on the lower panel, or may be merely operatively connected to the lower panel. The ends of actuator mechanism 28 may be rotatably attached at one or both of their attachment points, so that the actuators may change orientation as the secondary vehicle portion is moved between positions.

Extendible actuator mechanisms 28 are configured to change length so as to move the secondary vehicle portion between its retracted and extended positions. This may be accomplished by various mechanisms, including, for example, a ball screw mechanism or a machine screw mechanism, both of which are commonly known. Other forms of actuator mechanisms, such as chain-driven actuators or actuators that include two or more articulating parts, also may be used and may serve much the same purpose as screw-driven linear actuators. In general, any mechanism that provides relatively smooth length adjustments of the actuator members may be suitable. Furthermore, any suitable mechanism for powering the motions of the actuators may be used, such as an electric motor, a hydraulic mechanism, a human powered mechanism, or any combination thereof. In some embodiments, the actuators may be of a fully automatic "one-touch" variety, allowing a user simply to press a button in order to effect motion of the secondary vehicle portion between its retracted and extended positions. In other embodiments, the actuators may be manual or semi-automatic, requiring a user to effect motion of the secondary vehicle portion by hand to some extent. More detail about the possible structure and configuration of suitable actuator mechanisms is provided below with reference to FIG. 5.

Secondary vehicle portion 18 may include additional structure in addition to panels 20 and 22. For example, a pair of parallel diagonal railings 30 may couple each side of upper panel 20 to the vehicle body. As described in more detail below, diagonal railings 30 may be rotatably attached to the upper panel and also to the vehicle, allowing the diagonal railings to change their angular orientation with respect to both the vehicle and the panel, as the secondary vehicle portion moves between its retracted and extended positions. Because the diagonal railings are parallel and are attached to both the vehicle and the upper panel at fixed locations, the upper panel may be configured to move substantially without changing its angular orientation relative to the vehicle. That is, due to its attachment to the diagonal railings, the upper panel may be configured to remain substantially parallel to the side wall of the primary interior living space, as the secondary vehicle portion moves between the retracted position and the extended position.

A pair of corner posts or legs 32 may couple upper panel 20 to lower panel 22. Corner posts 32 may be of any desired dimensions. For example, the corner posts may be up to 34 inches or more in length, in which case they may extend along substantially the entire side edge of the upper panel, or they may be on the order of only 6-12 inches in length, in which case they may merely couple the upper and lower panels without extending much, if at all, along the edge of the upper panel. To allow desired motions of the panels, one or both of the upper and lower panels may be joined to each corner post via slidable hinges. For example, attaching the upper panel to the corner posts via slidable hinges allows the upper panel to slide vertically relative to the corner posts, to attain any desired vertical height with respect to the lower panel. For reasons that will be described in more detail below, it may be desirable for the top of the upper panel to be positioned at least 34 inches above the flat surface of the lower panel when the secondary vehicle portion is in its extended position.

Secondary vehicle portion 18 also may include a pair of side railings 34. As depicted in FIG. 3, railings 34 may be configured to fold out along with the diagonal side railings and the corner posts as the secondary vehicle portion moves between positions, until, as shown in FIG. 4, the side railings may be substantially parallel to lower panel 22 and to the ground under the vehicle. The side railings may be attached to the corner posts, they may be attached directly to the upper panel, or they may simply extend between the vehicle body and the outboard railing defined by the upper panel. In either case, rotatable and/or slidable hinges may be used to allow desired changes in the relative orientations of the upper panel, the side railings, the corner posts, and the diagonal railings.

As denoted in FIG. 4, side railings 34 may include various portions such as shaped upper bars 36, upper and lower arms 38, and a plurality of spaced-apart vertical posts 40. To allow storage of the entire secondary vehicle portion within or in close proximity to the sidewall of the vehicle, in some embodiments bars 36 and/or arms 38 may be telescoping members that are configured to change length as the secondary vehicle portion changes positions. In other embodiments, the side railings, including bars 36 and arms 38, may not be telescoping, but rather may be fixed in length. In these embodiments, the side railings may have a retracted position in which they are folded inward and disposed adjacent to and in substantially the same plane as lower panel 22, and an extended position as depicted in FIG. 4, in which they are folded outward and substantially perpendicular to the lower panel. In this manner, the side railings may be either manually or automatically folded into position from the balcony floor, either before or after the secondary vehicle portion moves into its extended position. To accomplish this, the side railings may be equipped with hinges or some other rotatable connection mechanism, to allow the railings to rotate between their retracted and extended positions.

FIG. 4 shows the secondary vehicle portion in its fully extended position, in which it forms a structure that may be described as an open-air porch or balcony adjacent to the primary vehicle portion, extending either from one side or from the rear of the vehicle. In its extended position, lower panel 22 defines a floor portion of the porch, and upper panel 20 defines an outboard railing of the porch. As noted previously, the top of the outboard railing, as well as the tops of side railings 34, may be configured to have any desired height relative to the floor of the porch. For example, the outboard and side railings may be at least 34 inches high relative to the floor of the porch. This may be desirable so that the porch or balcony defined by the extended secondary vehicle portion meets applicable codes or regulations, such as the International Building Code, regarding outdoor porches or balconies. Similarly, vertical posts 40 may be spaced 4 inches or less apart, also to meet applicable codes.

When extended out from body 12, secondary vehicle portion 18 is typically supported by actuators 28, and no additional supports are necessary. This is the case in the embodiment depicted in FIG. 4, in which the actuators are shown supporting the floor portion of the porch when the secondary vehicle portion is in the extended position. However, other supports, such as one or more legs extending downward from the secondary vehicle portion to the ground, may additionally or alternatively be provided. Such additional supports (not shown) may be foldable or otherwise configured to integrate within or near the sidewall of the vehicle when the secondary vehicle portion is in its retracted position.

A sliding door 42 may be provided to separate the primary vehicle portion from the secondary vehicle portion when the secondary vehicle portion is in its extended position. Door 42 may be of conventional design, and has all the same advantages as a door in a residence. For example, door 42 may serve to allow easy ingress and egress, and to admit light into the primary interior living space without allowing insects, cold air, etc. into the interior of the vehicle. The planar portions of sliding door 42 may be constructed from any desired materials, such as glass, screening material, or both. When the secondary living space is in its extended position, additional external access to the resulting open-air porch or balcony may be provided, for example, via a set of retractable stairs or a ladder (not pictured) connecting the secondary living space to the ground.

Figure 5:
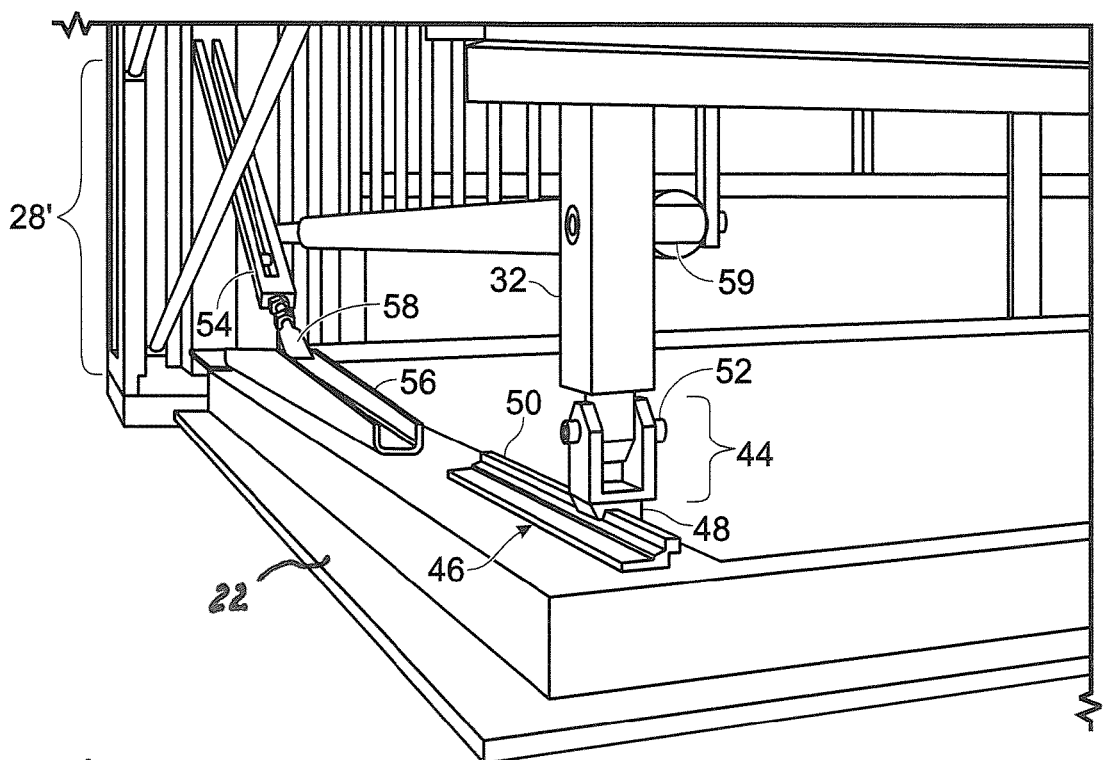
FIG. 5 is a partial perspective view of an embodiment of a secondary living space according to aspects of this disclosure, showing details of various portions of the secondary living space in an extended position.
Figure 7:
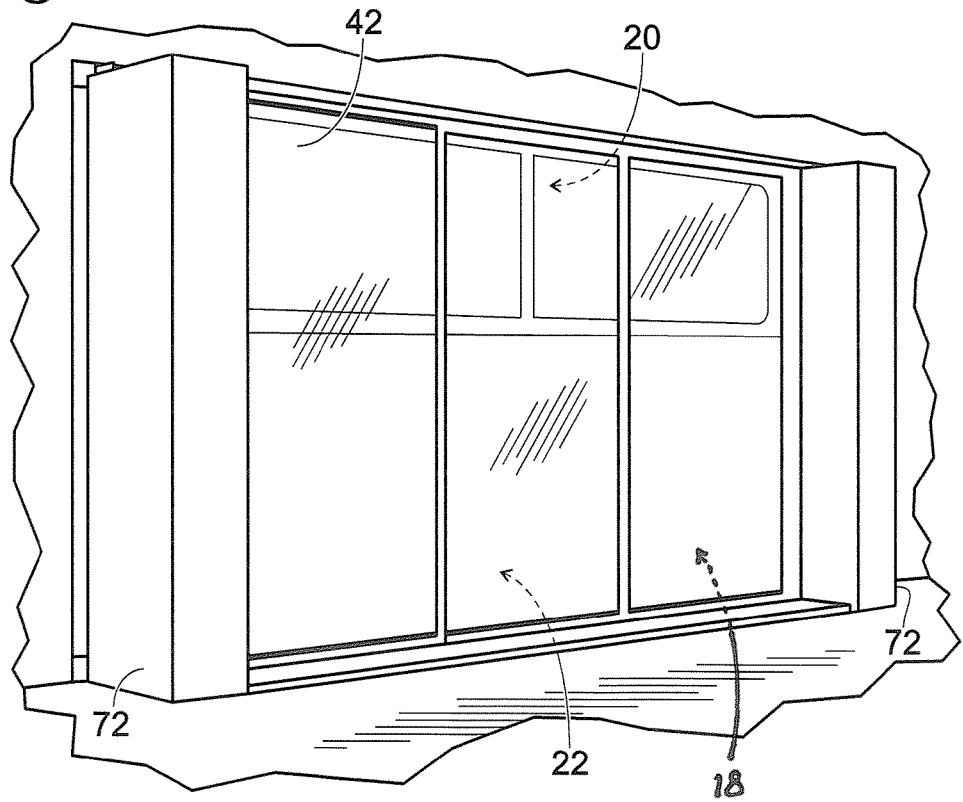
FIG. 7 is a partial perspective view of the interior of a vehicle with a retractable secondary living space, showing the secondary living space retracted according to aspects of the present disclosure.
Figure 6:
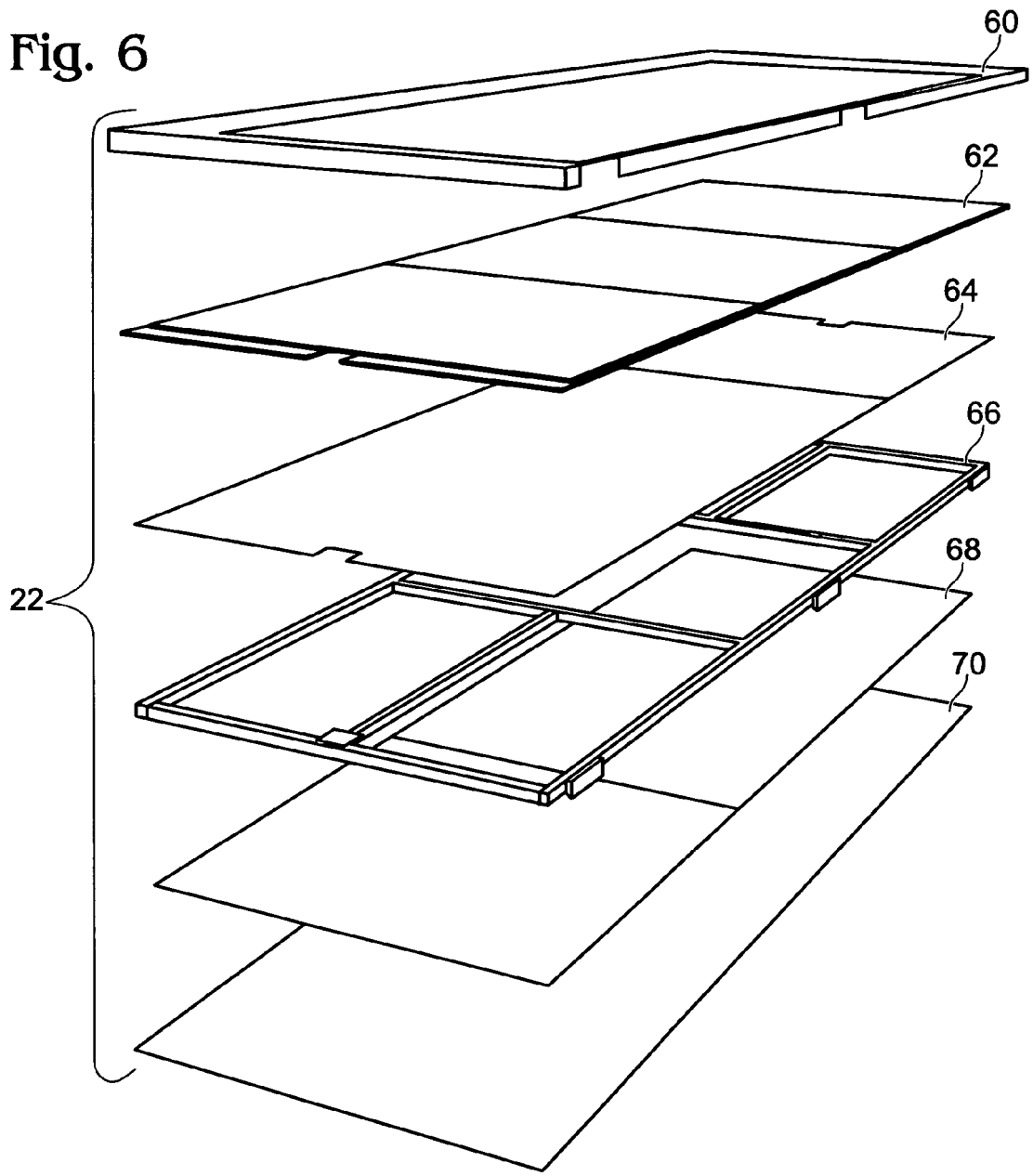
FIG. 6 is an exploded view of a floor portion of a secondary living space according to aspects of this disclosure.

FIGS. 5-7 show additional details of the possible structure of an extendible vehicle portion according to aspects of this disclosure. FIG. 5 shows one of posts 32 connected to lower panel 22 via a slidable hinge 44 and an associated track 46, the latter of which is fixed to the lower panel by any reliable means, including with standard mounting hardware, by soldering, by welding, or by gluing, among others. As the secondary vehicle portion moves between positions, a roughly u-shaped engagement portion 48 of hinge 44 slides along an associated engagement portion 50 of track 46, which has a shape complementary to the shape of portion 48 of the hinge. At the same time, hinge 44 allows post 32 to pivot around axis 52, to which the post is rotatably attached. In this manner, lower panel 22 can move from its retracted position, in which posts 32 are roughly parallel to the lower panel, to its extended position (shown in FIG. 5), in which posts 32 are roughly perpendicular to the lower panel.

FIG. 5 further shows an actuator mechanism 28' that differs slightly from actuator mechanism 28 depicted in FIGS. 3-4. The actuator mechanism depicted in FIG. 5 uses a hydraulically powered chain drive, and is connected to a synchronizing cylinder (not shown) to ensure that the actuators on each side of the lower panel move simultaneously by substantially equal amounts. Suitable synchronized hydraulic systems of this type may be obtained, for example, from the HWH Corporation of Moscow, Iowa. In the embodiment of FIG. 5, the synchronizing cylinder causes a pair of hydraulic cylinders to move a pair of chains 54 in coordinated linear motion. Each chain 54 is connected to an associated angle bracket 56 via a rotatable connection 58, and each angle bracket is fixedly attached to floor member 22. Thus, as chains 54 extend from their respective hydraulic cylinders in coordinated fashion, the floor member is evenly lowered into its extended position. Similarly, as chains 54 are retracted in coordinated fashion, the floor member is evenly raised into its retracted position.

FIG. 5 also depicts a boss 59 protruding from a lower portion of post 32, to which lower arm 38 of the side railing is attached. Boss 59, which may be integrally formed with post 32 or attached to it by any suitable means such as with standard hardware, by welding, or by soldering, provides an adequately offset attachment point for lower arm 38, so that the side railings and posts may be folded into the retracted position without interfering with each other. Additional bosses serving a similar purpose may be disposed at relatively higher portions of post 32 to provide attachment points for upper arm 38, and for diagonal railings 30. These bosses typically also are symmetrically disposed on the opposite corner post 32. The bosses may, for example, be hollow and internally threaded to allow threaded engagement of complementary externally threaded attachment hardware associated with the arms of the side railing and the diagonal railings. Alternatively, the bosses may include externally threaded attachment structures to engage complementary internally threaded structures on the railings. The hardware used for engaging any or all of the railings with the corner posts may allow rotation, for instance through the use of rotatable attachment hardware such as hinges or ball joints at or near the attachment points.

FIG. 6 shows details of an embodiment of lower panel 22, including various layers that may be incorporated into the lower panel to make it suitable both as a side wall portion of the vehicle when in its retracted position, and as a floor portion of a secondary living space when in its extended position. As depicted in FIG. 6, lower panel 22 may include a face frame 60, a plywood (or similar) covering layer 62, a first supporting sheet 64, a tubular frame 66, a second supporting sheet 68, and a durable exterior skin layer 70. These layers are shown in FIG. 6 and listed above from top to bottom when the lower panel is in its extended position, corresponding to the order of the layers from inside to outside the vehicle when the lower panel is in its retracted position.

Supporting sheets 64 and 68, which surround tubular frame 66, together may form a relatively inflexible core that minimizes deflection of the lower panel under loading, when the lower panel is in its extended position and weight is placed on the floor of the extended living space. Accordingly, supporting sheets 64 and 68 may be constructed of sheet metal, such as 16 gauge steel, although many modifications are possible that will serve the same purpose. Similarly, tubular frame 66 may be constructed from 1.5 inch diameter steel tubing, or from any other suitable material. In some embodiments, one or more of the layers shown in FIG. 6 may be omitted, or additional layers may be added, as long as the lower panel is capable of safely supporting the weight of one or more persons when in its extended position.

FIG. 7 shows a view from inside the vehicle with secondary vehicle portion 18 in its fully retracted position. As FIG. 7 depicts, upper panel 20 and lower panel 22 are disposed to the exterior side of sliding door 42, and may be visible through the door, if the door is constructed of a transparent material such as glass. In the depicted embodiment, when the secondary vehicle portion is retracted, actuator mechanisms 28 (or 28'), along with the retracted side railings 34 (including portions 36, 38, and 40), diagonal railings 30, and corner posts 32, all are folded into a relatively compact space. These structures may protrude to some extent into the interior of the vehicle, in which case they may be housed inside a pair of waterproof storage compartments 72, as depicted in FIG. 7. This provides aesthetic benefits, particularly from within the vehicle, and also prevents water, dirt, and the like that may accumulate on the extended porch from penetrating to the interior living space of the vehicle. In alternative embodiments, some of the railing structure, such as side railings 34, may be manually folded inward, adjacent to and substantially coplanar with the lower panel, when the secondary vehicle portion is in its retracted position. This may decrease the size of storage compartments 72, or even eliminate the need for such compartments entirely.

Figure 8:
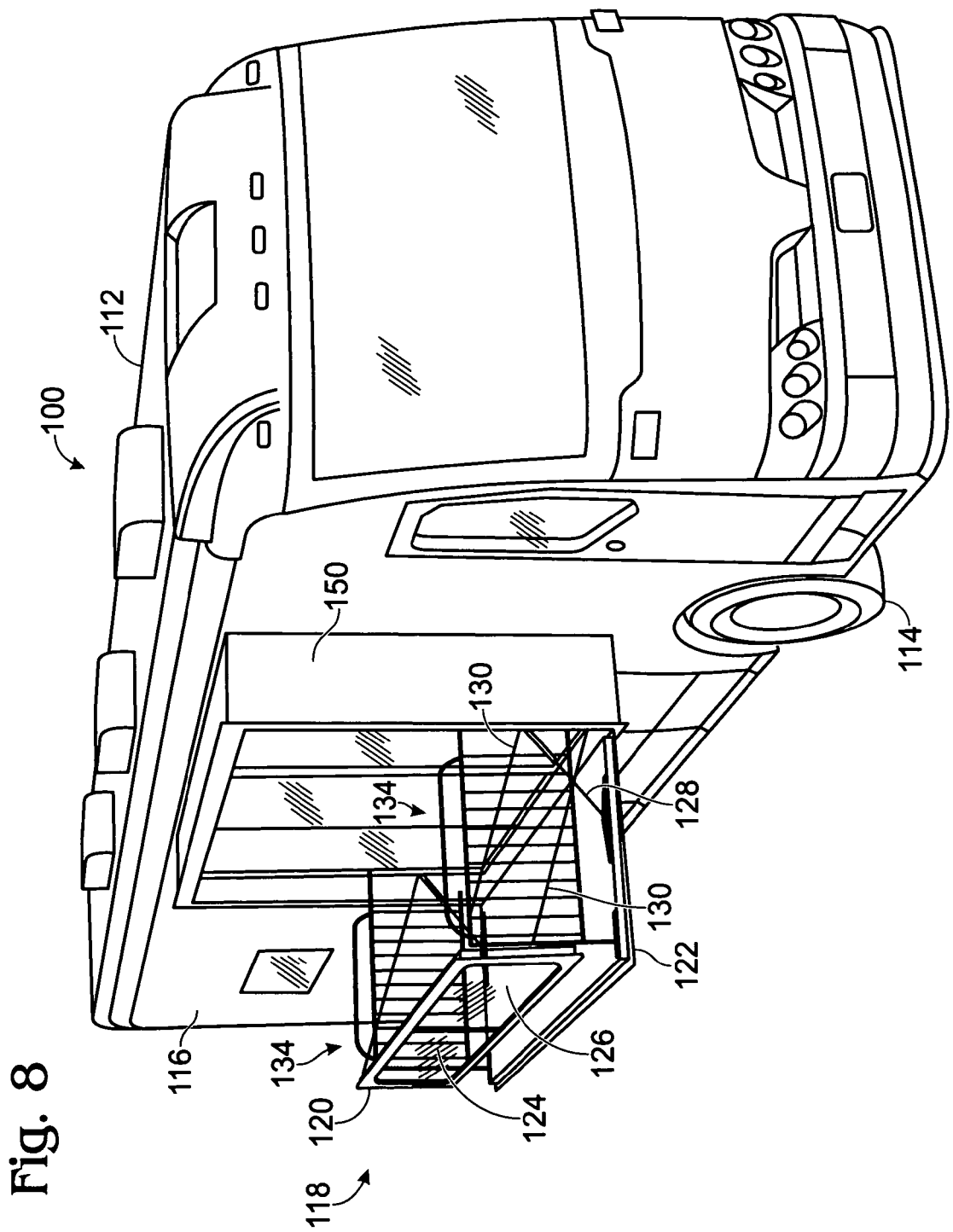
FIG. 8 is a perspective view of a vehicle including an alternative embodiment of a retractable secondary living space, according to aspects of the present disclosure.

FIG. 8 depicts a recreational vehicle 100 that includes an alternative embodiment of an extendible secondary vehicle portion 118, shown in its fully extended position. Other than the differences in the structure of the secondary vehicle portion, which will be described below, vehicle 100 is substantially similar to vehicle 10 depicted in FIG. 1, and therefore will not be described in great detail. Generally speaking, vehicle 100 includes a body 112 (including front and/or rear end caps), wheels 114, an engine, a primary vehicle portion 116, and front and rear axles, all of which are substantially similar to the corresponding portions of vehicle 10 depicted in FIG. 1.

Secondary vehicle portion 118 depicted in FIG. 8 differs from portion 18 depicted in the previous drawings in that secondary vehicle portion 118 is configured as a portion of a slide-out structure 150. The term "slide-out" generally refers to additional living space that selectively slides out from the body portion of a vehicle, typically on rails and either hydraulically, electrically, or manually. A slide-out living space is disclosed, for example, in U.S. Pat. No. 7,100,967 to Shea, which relates to a slide-out atrium for a recreational vehicle. Such slide-out structures increase the amount of living space available inside the vehicle, but generally do not add exterior living space in the manner of extendible portion 18 described in the present disclosure.

Secondary vehicle portion 118 provides an exterior living space, such as an open-air porch or balcony, in a manner similar to the exterior living space provided by secondary vehicle portion 18, while also increasing the interior living space of the vehicle in the manner of a typical slide-out structure. Thus, as depicted in FIG. 8, secondary vehicle portion 118 may include an upper panel 120 (including windows 124 and 126), a lower panel 122, and side railings 134, all of which selectively move between retracted positions in which they form a wall portion and/or exterior body portion of the vehicle, and an extended position in which they provide an open-air porch or balcony. All of these structures are substantially similar, in both construction and function, to the corresponding structures of secondary vehicle portion 18, and thus may be configured to fold into a relatively compact structure when secondary vehicle portion 118 is fully retracted.

Motions of vehicle portion 118 between retracted and extended positions may be accomplished in much the same manner as in the case of secondary vehicle portion 18, for example through the use of actuators 128, diagonal railings 130, slidable hinged connections, and the like, all of which have been described previously with reference to FIGS. 1-7 and which therefore will not be described in detail again. The mechanisms for extending and retracting the open-air porch and for sliding out structure 150 may either be independent or integrated together. In other words, structure 150 may slide out independently of the operation of actuators 128, for example through the use of an independent electric motor, hydraulic mechanism, or manual control mechanism, or a single mechanism may operate both the sliding motions of the porch and the actuators or other deployment mechanism for the open-air porch. In either case, motion of the porch structure between its retracted and extended positions may occur before, after, or simultaneously with sliding motions of slide-out structure 150.

When deployed into its extended position, secondary vehicle portion 118 may be supported by actuators 128, just as secondary vehicle portion 18 may be supported by actuators 28. Alternatively, secondary vehicle portion 118 may be partially or entirely supported by underlying rails (not shown), which typically will be disposed beneath slide-out portion 150 to support the slide-out. Such underlying rails may, for example, be equipped with telescoping members, or simply may be long enough to extend beneath part or all of lower panel 122 when secondary vehicle portion 118 is deployed into its extended position, to support portion 118 and any users of the porch from below. As another alternative, secondary vehicle portion 118 may be equipped with legs or posts configured to extend to the ground, to support the porch vertically from below. Of course, the extended porch may be partially supported by actuators 128, and partially supported by underlying rails and/or vertical legs. Any support mechanism may be suitable if the mechanism can safely support the weight of the porch itself, items that might be desirably located on the porch, and human users of the porch.

It is believed that the disclosure set forth above encompasses multiple distinct inventions with independent utility. While each of these inventions has been disclosed in a particular form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it is within the scope of the present inventions that such disclosure or claims may be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A recreational vehicle comprising:
a primary vehicle portion defining a primary interior living space; and
a secondary vehicle portion movable between a retracted position in which the secondary vehicle portion is substantially contained within the primary vehicle portion, and an extended position in which the secondary vehicle portion extends outside the primary vehicle portion and provides a secondary living space in addition to the primary interior living space;
wherein the secondary vehicle portion includes a lower panel configured to move from a first position in which the lower panel is integrated within a side wall portion of the primary living space to a second position in which the lower panel defines a floor portion of the secondary living space, and an upper panel configured to move, substantially without changing angular orientation, from a first position in which the upper panel is integrated within the side wall portion of the primary living space to a second position in which the upper panel defines an outboard railing of the secondary living space.

2. The recreational vehicle of claim 1, further comprising a sliding door separating the primary vehicle portion from the secondary vehicle portion when the secondary vehicle portion is in the extended position.

3. The recreational vehicle of claim 1, wherein the secondary vehicle portion further includes a pair of corner posts coupling the upper panel to the lower panel, and a pair of side railings extending substantially between the primary vehicle portion and the corner posts.

4. The recreational vehicle of claim 1, further comprising a pair of diagonal railings coupling each side of the upper panel to the vehicle and configured to maintain substantially constant angular orientation of the upper panel as the upper panel moves from the first position to the second position.

5. The recreational vehicle of claim 1, further comprising an actuator mechanism configured automatically to move the secondary vehicle portion between the retracted position and the extended position and to support the floor portion of the secondary living space when the secondary vehicle portion is in the extended position.

6. A recreational vehicle comprising:
a primary vehicle portion defining a primary interior living space; and
an extendible secondary vehicle portion operatively coupled to the primary vehicle portion, the secondary vehicle portion movable between a retracted position and an extended position and providing an open-air balcony when in the extended position;
wherein the secondary vehicle portion includes a pair of substantially planar and nonoverlapping members movable from a first configuration in which the members collectively define a side wall portion of the vehicle when the secondary vehicle portion is in the retracted position, to a second configuration in which the members define portions of the open-air balcony when the secondary vehicle portion is in the extended position;
wherein the pair of members includes an upper member and a lower member configured to rotate relative to each other as the secondary vehicle portion moves from the retracted position to the extended position;
wherein the upper member defines an outboard railing of the balcony when the secondary vehicle portion is in the extended position; and
wherein the upper member is configured to remain substantially parallel to a side wall of the primary interior living space as the secondary vehicle portion moves between the retracted position and the extended position.

7. The recreational vehicle of claim 6, further comprising a sliding door separating the primary interior living space from the secondary living space when the secondary vehicle portion is in the extended position.

8. The recreational vehicle of claim 6, wherein the lower member defines a floor portion of the balcony when the secondary vehicle portion is in the extended position.

9. The recreational vehicle of claim 8, further comprising a pair of synchronized actuator members configured automatically to move the secondary vehicle portion between the retracted position and the extended position and to support the floor portion of the balcony when the secondary vehicle portion is in the extended position.

* * * * *